US005182062A

United States Patent [19]

Lee et al.

[11] Patent Number: 5,182,062

[45] Date of Patent: Jan. 26, 1993

[54] RESPONDER TARGET FOR THEFT DETECTION APPARATUS

[75] Inventors: J. Kelly Lee; Svetlana Reznik; Matthias H. Regelsberger, all of Rochester, N.Y.

[73] Assignee: Eastman Kodak Company, Rochester, N.Y.

[21] Appl. No.: 640,744

[22] Filed: Jan. 14, 1991

[51] Int. Cl.[5] .............................................. B32B 11/16

[52] U.S. Cl. ............................... 264/129; 156/244.18; 156/269; 156/303; 264/145; 427/128

[58] Field of Search ................ 264/145, 129; 340/572; 427/128; 156/244.18, 269, 302, 303

[56] References Cited

U.S. PATENT DOCUMENTS

| | | | |
|---|---|---|---|
| 3,765,007 | 10/1973 | Elder | 340/572 |
| 4,163,823 | 8/1979 | Legrns et al. | 427/128 |
| 4,222,517 | 9/1980 | Richardson | 340/572 |
| 4,518,627 | 5/1985 | Foley et al. | 427/128 |
| 4,536,229 | 8/1985 | Jin et al. | 148/310 |
| 4,640,790 | 2/1987 | Sylvester et al. | 427/128 |
| 4,778,552 | 10/1988 | Benge et al. | 156/272.2 |
| 4,923,711 | 5/1990 | Charnega et al. | 427/128 |

FOREIGN PATENT DOCUMENTS

| | | | |
|---|---|---|---|
| 2732167 | 1/1978 | Fed. Rep. of Germany | 340/572 |

*Primary Examiner*—Jay H. Woo
*Assistant Examiner*—Robert B. Davis
*Attorney, Agent, or Firm*—Mark Z. Dudley

[57] ABSTRACT

A responder target for a magnetic detection system includes a signal element of high permeability low coercivity magnetic material such as permalloy or amorphous metal, and a control element of ferric oxide powder having the formula $Fe_3O_4$ dispersed in a polymer binder. The ferric oxide powder having a coercivity $H_c$ in the range of 50–150 Oe and a particle size of 20–100 μm, dispersed 20–35% by weight in the polymer binder. The ferric oxide powder in the binder is coated on a substrate to form a control element strip, laminated to the signal element, and chopped into lengths to form the responder target. Alternatively, the signal element strip is laminated to a support layer, and the ferric oxide is coated by extrusion over the signal element.

2 Claims, 3 Drawing Sheets

RESPONDER TARGET FOR THEFT DETECTION APPARATUS

TECHNICAL FIELD

This invention relates to theft detection apparatus of the type in which a protected object is detected by monitoring the magnetic fields produced by responder targets on protected articles when such articles are carried through an interrogation zone in which an alternating magnetic field is generated. In particular the invention comprises improvements relating to the responder targets and their manufacture.

BACKGROUND ART

French Patent No. 763,681 to Pierre Arthur Picard discloses an article theft detection apparatus of the type to which this invention applies. As described in that patent, articles to be protected from theft are provided with responder targets in the form of thin strips of material having a high magnetic permeability and low coercivity and which are rapidly and repeatedly driven into and out of magnetic saturation in the presence of an alternating magnetic interrogation field. The strength of the magnetic interrogation field exceeds the coercivity of the responder target, so that the magnetization of the responder target is flipped when the field alternates. An interrogation antenna is provided at an interrogation zone in a passageway leading to the exit of a store or a protected area in a store; and means are provided to cause the interrogation antenna to generate an alternating magnetic field at a given frequency and at an intensity sufficient to saturate a responder target in the interrogation zone. As a result, the responder target itself produces alternating magnetic fields. A receiver antenna is also provided at the interrogation zone to receive the magnetic fields produced by the responder target. The receiver antenna is connected to a receiver which is tuned to detect signals produced by the responder target; and an alarm is connected to the receiver to be activated when such detection takes place.

U.S. Pat. No. 4,222,517 issued Sep. 16, 1980, to Richardson discloses a deactivatable responder target comprising a signal element in the form of a ribbon of relatively low coercivity ferro-magnetic material and having coupled thereto control elements of a ferro-magnetic material which may be permanently magnetized by a control signal to saturate the strip of first ferromagnetic material, thereby preventing the first ferromagnetic material from responding when interrogated by a periodic magnetic signal. The coercivity of the control elements are at least as high as the peak amplitude of the interrogation field. Typically, the coercivity of such control elements is 50 Oe to 150 Oe, a factor 10 to 30 higher than a typical interrogation field of 5 Oe. The control elements are typically formed from the alloy of cobalt, vanadum and iron known as vicalloy.

To assemble the responder targets, long continuous ribbons of the constituent elements are formed, the elements are bonded to one another between compression rollers, and the responder targets are cut from the bonded strip.

The use of materials that could be coated in strips rather than chopped would improve the manufacturability of the responder targets. U.S. Pat. No. 3,765,007 issued Oct. 9, 1973 to Elder describes the use of a thin coating of γ-ferric oxide powder in a vinyl chloride binder as a control element. Experiments conducted by the present inventors have shown, however, that γ-ferric oxide powder has too high a coercivity to be useful in a responder target of the type shown in U.S. Pat. No. 4,222,517.

DISCLOSURE OF THE INVENTION

It is, therefore, the object of the present invention to provide an improved deactivatable responder target. It is a further object to provide such a target having improved manufacturability.

The object is achieved according to the present invention by providing a deactivatable magnetic responder target having a conventional target strip of magnetically soft material such as permalloy amorphous metal and a control element comprising ferric oxide particles having the formula $Fe_3O_4$ dispersed in a polymer binder and having a coercivity $H_c$ in the range of 50 to 150 Oe.

According to a preferred embodiment, the ferric oxide powder has a specific resistance of 5,000 ohms, a particle size of 40 μ, a specific gravity of 4.98 gr/cm$^3$ and a PH between 8 and 9. The magnetic particles are dispersed in polyurethane resin binder at 20 to 35 weight percent.

MODES OF CARRYING OUT THE INVENTION

Figure 1:
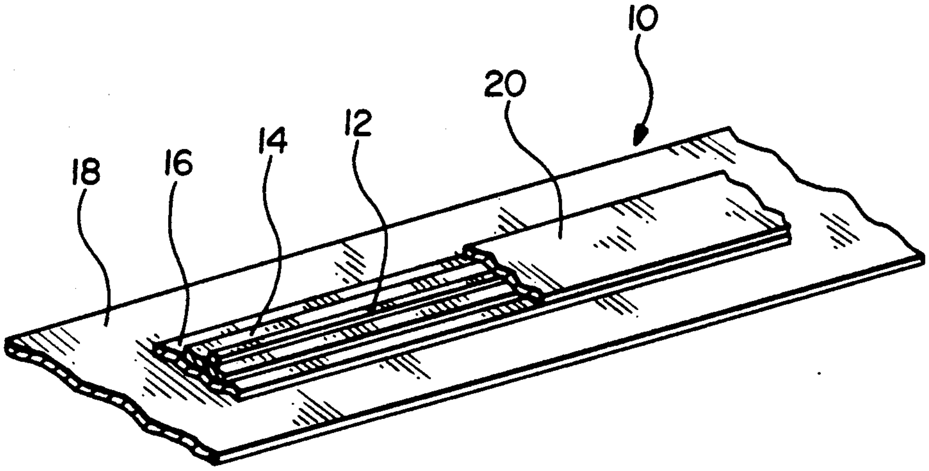
FIG. 1 is an enlarged partial perspective view of a deactivatable magnetic responder target according to the present invention.

FIG. 1 shows the construction of a deactivatable magnetic responder target 10 according to the present invention. As shown, the responder target comprises a signal element in the form of a long thin ribbon 12 of magnetically saturable material such as permalloy or amorphous metal (i.e. sold as Metglas TM by Allied Chemical Corporation) and a control element in the form of a long thin ribbon of higher coercivity material 14. The signal element 12 and the control element 14 are carried by a strip 16 of double-sided adhesive tape. Several of the targets may be arranged on a paper carrier 18 that is provided with a coated surface for easy removal of a responder target for application to an object. Each responder target is also covered with a protective cover of adhesive tape 20.

According to the present invention, the control element 14 comprises ferric oxide particles having the formula $Fe_3O_4$ dispersed in a polymer binder, and having a coercivity of 50 to 150 Oe. The control element 14, when subjected to a magnetic field, becomes magnetized in accordance with the field, and retains that magnetization until later subjected to a different field. When the control element 14 is subjected to a relatively large pattern of variously directed magnetic fields, e.g. a series of oppositely directed fields along the length of the strips, it becomes magnetized accordingly and subjects the signal element to the same magnetic pattern. As a result, the saturatable strip 12 becomes incapable of responding to an alternating interrogation field, thereby deactivating the magnetic responder target. When the control element is subjected to a relatively smaller pattern of variously directed magnetic fields, it becomes magnetized accordingly, but the resulting closely spaced fields are incapable of affecting the signal element 12 so that the responder target becomes reactivated. In this way, the responder target can be deactivated and reactivated any number of times by employing apparatus shown in U.S. Pat. No. 4,665,387 issued to Cooper et al. May 12, 1987.

Figure 2:
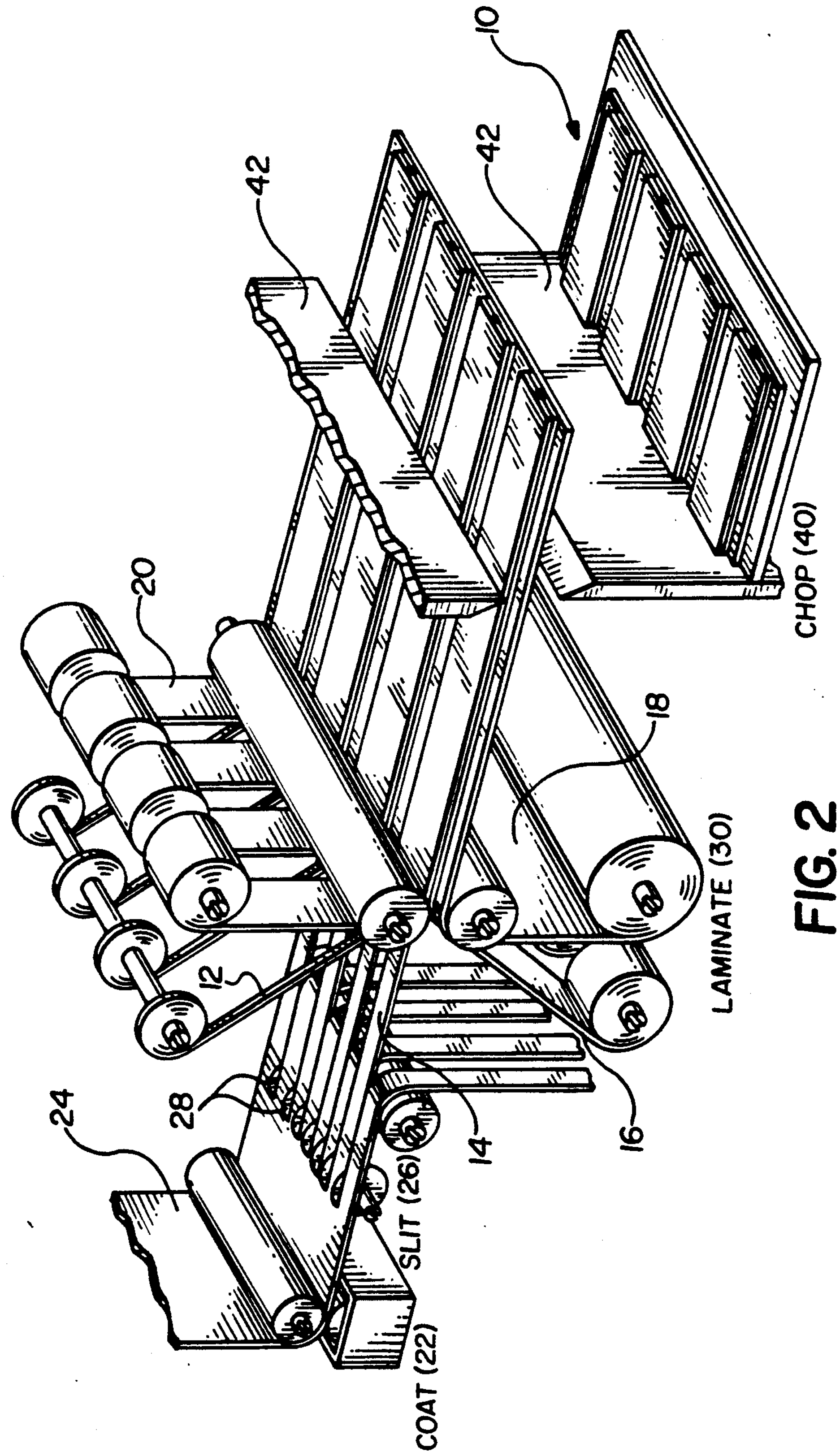
FIG. 2 is a schematic diagram illustrating the steps employed in making the deactivatable responder target shown in FIG. 1.

Referring now to FIG. 2, according to one mode of assembling the responder target strips according to the present invention, a plurality of continuous control elements 14 are formed simultaneously by coating (22) a substrate 24 with a mixture of ferric oxide particles in a binder. This is accomplished in the same manner as the manufacture of magnetic tape which is well known in the art. The control elements are slit (26) by slitting knives 28, and the control elements are laminated (30) to a strip of low coercivity magnetic material 12 which comprises the signal elements, double-sided tape 16, single-sided tape 20, and the backing paper 18. The laminated webs of targets are then chopped (40) by knives 42 to form strips of individual responder targets 10.

The substrate 24 is preferably 0.08 mm (0.003") polyester film. A suitable source of ferric oxide powder having the desired properties is Sumiron 2 CRMS TM powder sold by Sumitomo Metal Industries Ltd., Osaka Steel Works, Osaka, Japan as a pigment for paints. This powder is a Cr-based low-alloy steel powder manufactured through an oil atomization process. Another suitable source of powder is the magnetic MAT series of magnetic toner particles sold by Toda Kogyo Corporation, Hiroshima, Japan. Toda Kogyo Corporation MAT-305 TM and MAT-301 TM powders are preferred. An analysis of these powders shows that they are ferric oxide powders having a theoretical formula $Fe_3O_4$ with a specific resistance of 5000 Ohms, a particle size of 20–100 (preferably 40) μm, a specific gravity of 4.98 g/cm$^3$ and PH between 8 and 9. The binder is CA 139/THF Morton Chemicals trade name "MORTHANE" polyurethane/polyester resin in toluene solvent. The ferric oxide powder in the polymer binder is coated to result in a layer 0.10 mm (approximately 0.004") thick.

The individual responder targets are from 6 to 10 cm long. The signal element 12 made of amorphous metal is typically 2 mm wide by 25 μm thick, and the control element 14 is $\geqq$2 mm wide (at least as wide as the signal element).

Figure 3:
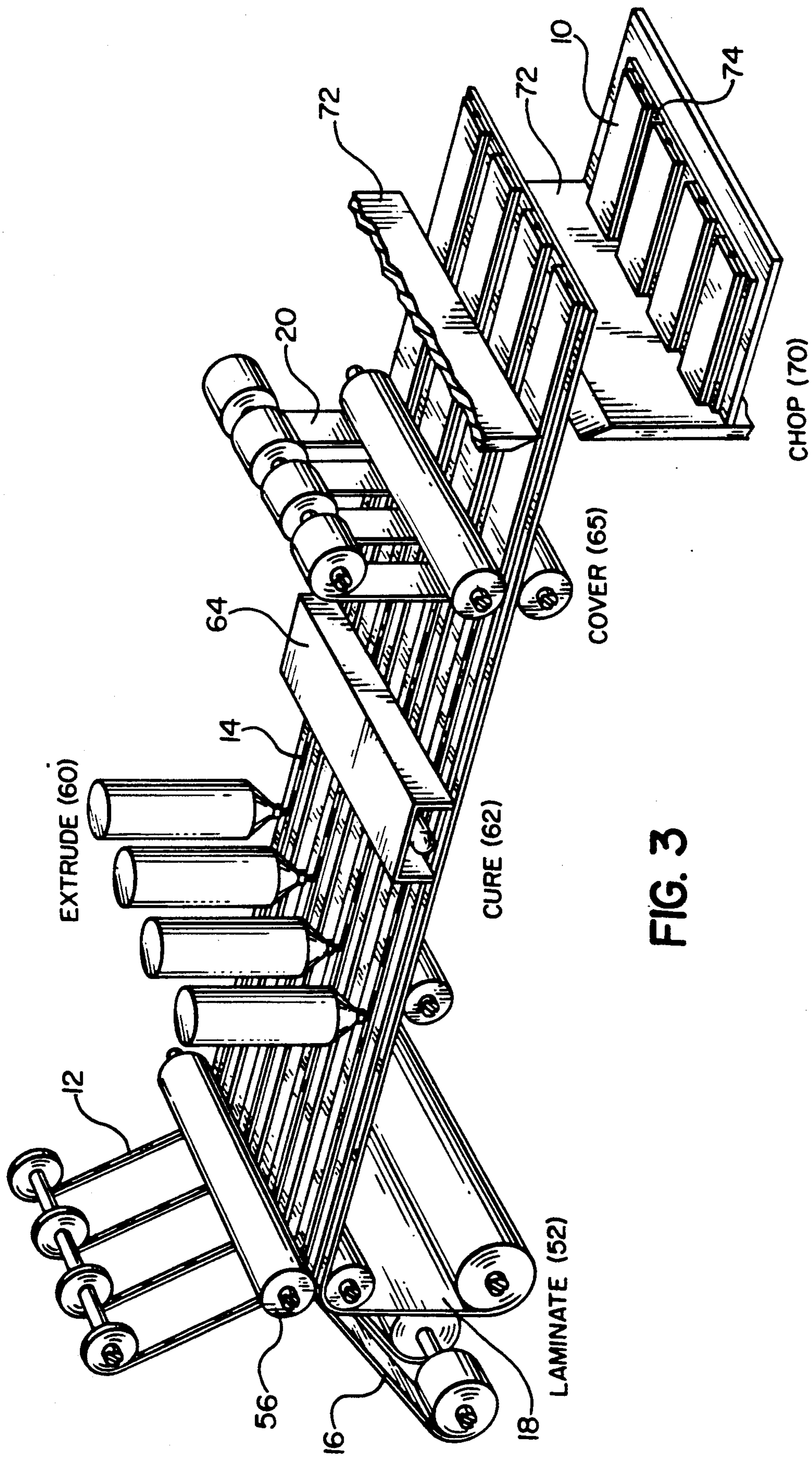
FIG. 3 is a schematic diagram illustrating an alternative method of making a deactivatable responder target of the type having a plurality of control elements.

FIG. 3 shows an alternative method of assembling a responder target having a discontinuous control element 14 according to the present invention. In this version, strips of the low coercivity magnetic material 12 which will form the signal elements are laminated (52) to strips of double sided backing tape 16 and backing paper 18 by pressure roller 56. Discontinuous control element strips 14 are formed over the signal element strip material 12 by extruding (60) the ferric oxide powder in a thermal setting binder. The ferric oxide powder/binder is cured (62) in an oven 64 and the responder targets are covered (65) by adhesive tape 20. The backing paper 18 bearing the responder targets is then chopped (70) by knives 72 to form sheets 74 having individual responder targets 10 with discontinuous control elements. In use, the individual responder targets are removed from the backing paper 18 and attached to an article.

The size of the control elements depends on the size of the signal elements, and generally are as wide as or wider than the signal elements. Preferably, the discontinuous control element strips 58 are 2 cm long 33 3 mm wide spaced apart by 2 cm.

INDUSTRIAL APPLICABILITY AND ADVANTAGES

The responder targets according to the present invention are useful in magnetic detection systems and are advantageous in that they can be manufactured at a lower cost than the prior art responder targets.

We claim:

1. A method of making a deactivatable responder target for use in a magnetic security system comprising the steps of:

a. coating a dispersion of ferric oxide particles in a polymer binder on a film base, the ferric oxide particles having the formula $Fe_3O_4$ and a coercivity $H_C$ in the range of 50 to 150 Oe to form a control element;

b. laminating a strip of high permeability and low coercivity magnetic material to the control element, the strip of high permeability and low coercivity magnetic material forming a signal element; and c. chopping the laminated control element and signal elements into strips to form the responder target.

2. A method of making a deactivatable responder target for use in a magnetic security system, comprising the steps of:

a. extruding a dispersion of ferric oxide particles in a thermosetting polymer binder, on a strip of high permeability low coercivity magnetic material, the strip of high permeability and low coercivity magnetic material forming a signal element, the ferric oxide particles having the formula $Fe_3O_4$, and a coercivity in the range of 50–150 Oe;

b. curing the thermal setting binder to form control elements; and c. chopping the control elements and signal elements into strips to form the responder targets.

* * * * *